United States Patent [19]

Jones

[11] Patent Number: 4,902,230

[45] Date of Patent: Feb. 20, 1990

[54] ROTATIONAL EDUCATIONAL APPARATUS

[76] Inventor: Stephen P. Jones, 12 Maddox Street, Alexandria, New South Wales 2015, Australia

[21] Appl. No.: 259,516

[22] Filed: Oct. 18, 1988

[30] Foreign Application Priority Data

Oct. 19, 1987 [AU] Australia ............................... PI4988

[51] Int. Cl.⁴ ................................................. G09B 1/20
[52] U.S. Cl. ...................................... 434/206; 434/174
[58] Field of Search ......................... 434/206, 174, 191

[56] References Cited

U.S. PATENT DOCUMENTS 3,574,957  4/1971  Bridick .
4,026,043  5/1977  Caruso ................................. 434/174
4,651,992  3/1987  Danino et al. ................... 434/206 X

FOREIGN PATENT DOCUMENTS 544712    4/1942  United Kingdom .
641771    8/1950  United Kingdom .
985661    3/1965  United Kingdom .
2107997   5/1983  United Kingdom .

Primary Examiner—William H. Grieb
Attorney, Agent, or Firm—Hill, Van Santen, Steadman & Simpson

[57] ABSTRACT

A relational, rotational structure incorporating a plurality of rotatable components 1, 2, 3, 4, 5 mounted on a common shaft 6. Indicia are located on peripheral portions of the rotatable components. The indicia can be related to each other in an educational manner by appropriate rotation of the components in such a way as to align indicia in specified arrangements.

The structure is particularly useful for teaching young children their multiplication tables and spelling.

3 Claims, 6 Drawing Sheets

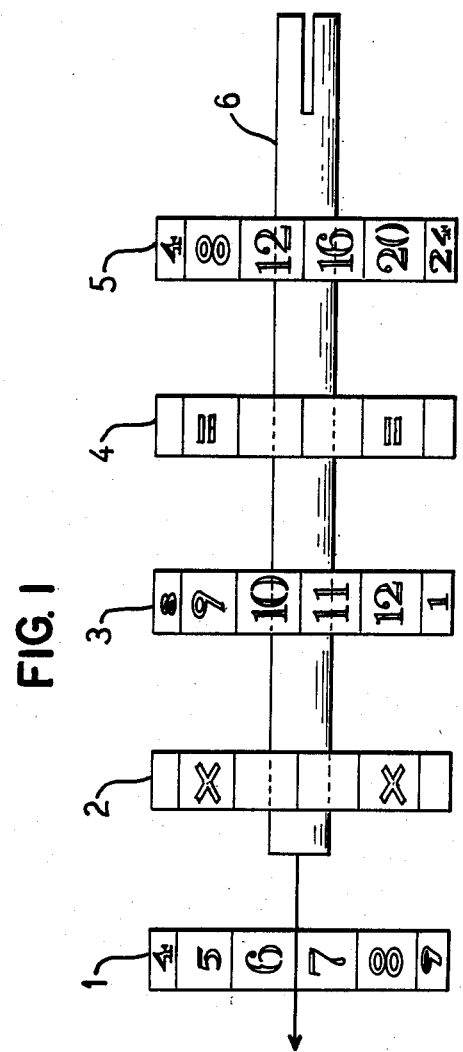

FIG.3

| A | B | C | D | E1 | E2 | E3 | E4 | E5 | E6 | E7 | E8 | E9 | E10 | E11 |
|---|---|---|---|----|----|----|----|----|----|----|----|----|-----|-----|
| 1 | x | 1 | = | 2 | 3 | 4 | 5 | 6 | 7 | 8 | 9 | 10 | 11 | 12 |
| 2 | x | 2 | = | 4 | 6 | 8 | 10 | 12 | 14 | 16 | 18 | 20 | 22 | 24 |
| 3 | x | 3 | = | 6 | 9 | 12 | 15 | 18 | 21 | 24 | 27 | 30 | 33 | 36 |
| 4 | x | 4 | = | 8 | 12 | 16 | 20 | 24 | 28 | 32 | 36 | 40 | 44 | 48 |
| 5 | x | 5 | = | 10 | 15 | 20 | 25 | 30 | 35 | 40 | 45 | 50 | 55 | 60 |
| 6 | x | 6 | = | 12 | 18 | 24 | 30 | 36 | 42 | 48 | 54 | 60 | 66 | 72 |
| 7 | x | 7 | = | 14 | 21 | 28 | 35 | 42 | 49 | 56 | 63 | 70 | 77 | 84 |
| 8 | x | 8 | = | 16 | 24 | 32 | 40 | 48 | 56 | 64 | 72 | 80 | 88 | 96 |
| 9 | x | 9 | = | 18 | 27 | 36 | 45 | 54 | 63 | 72 | 81 | 90 | 99 | 108 |
| 10 | x | 10 | = | 20 | 30 | 40 | 50 | 60 | 70 | 80 | 90 | 100 | 110 | 120 |
| 11 | x | 11 | = | 22 | 33 | 44 | 55 | 66 | 77 | 88 | 99 | 110 | 121 | 132 |
| 12 | x | 12 | = | 24 | 36 | 48 | 60 | 72 | 84 | 96 | 108 | 120 | 132 | 144 |

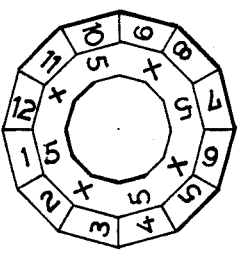
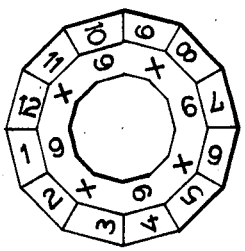
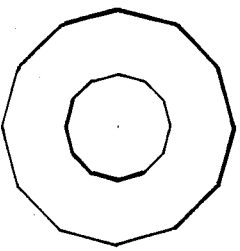
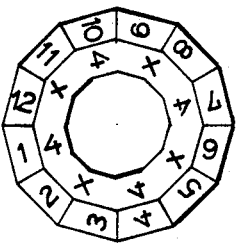
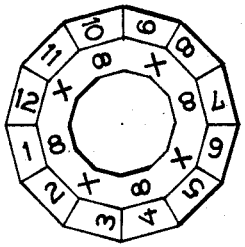
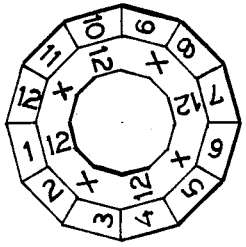
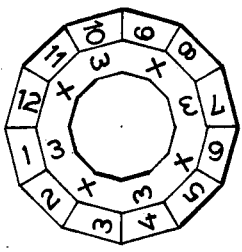
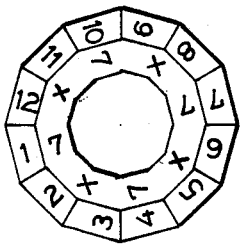
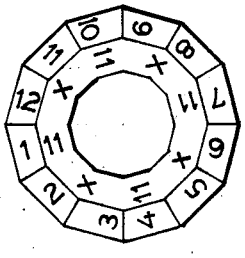
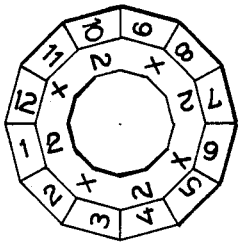
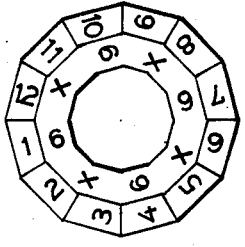
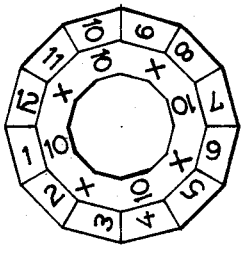

ROTATIONAL EDUCATIONAL APPARATUS

BACKGROUND OF THE INVENTION

Field of the Invention

This invention relates to an educational device for teaching multiplication.

SUMMARY OF THE INVENTION

The present invention relates to a relational, rotational structure and, in particular, to such a structure useful in educational and novelty item applications.

The present invention seeks to provide a novel way of allowing comparison between indicia arranged in lines where the relationship between the indicia is variable.

In one broad form there is provided a relational, rotational structure comprising a plurality of disc shaped elements mounted in juxtaposed relation and for rotation on a common axis; individual ones of said elements having indicia located on the periphery of each said element such that the relationship between indicia on different ones of said elements can be viewed with respect to indicia on others of said elements.

In one preferred form the number of said elements is five, the first of said elements including indicia comprising the numerals 1 through to 12, the second of said elements including indicia selected from the set of symbols "X, +, −, ÷", the third of said elements including indicia selected from the numerals 1 through to 12, the fourth of said elements including indicia being an "=" sign, the fifth of said elements including indicia comprising numerals selected from the answers to individual ones of the 2 through 12 times table.

In an alternative preferred form the number of said elements is approximately fifteen, each element incorporating indicia comprising the letters of the alphabet.

Preferably each character comprising said indicia lies on a separate flat surface on the periphery of said element.

BRIEF DESCRIPTION OF THE DRAWINGS

Embodiments of the present invention will now be described with reference to the drawings in which:

FIG. 1 is an exploded view of a first embodiment;

FIG. 3 shows details of the numerals comprising the indicia on the disc shaped elements comprising the first embodiment;

FIG. 4 shows end views of the fifth elements of the first embodiment;

DESCRIPTION OF THE PREFERRED EMBODIMENTS

Figure 2A:
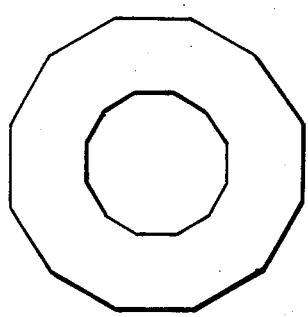
FIGS. 2A–2F show a cross-sectional and end views of the first embodiment.
Figure 2B:
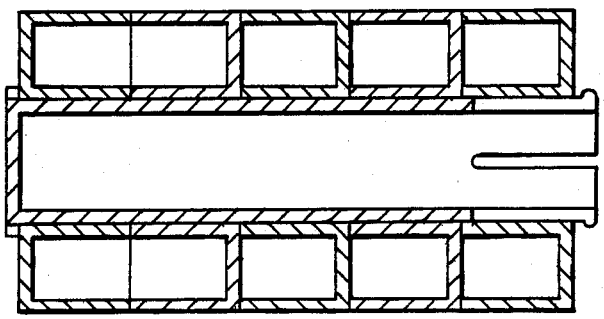
Figure 2C:
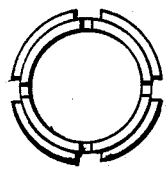
Figure 2D:
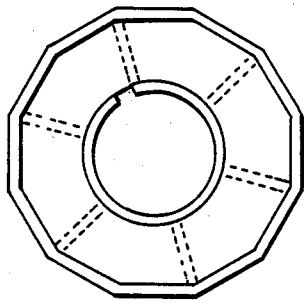
Figure 2E:
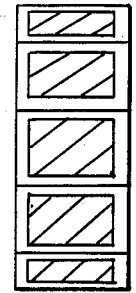
Figure 2F:
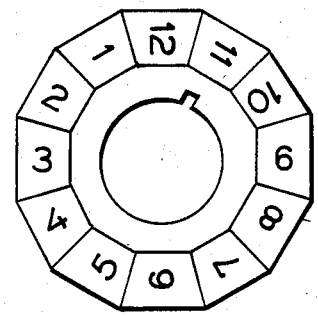

Referring to FIG. 1 there is shown a first embodiment of the invention being an educational aid for helping children to learn multiplication tables. The device of the first embodiment comprises five disc shaped elements 1, 2, 3, 4, 5 arranged in juxtaposed relation upon an axis 6. The first element 1 has the numbers 1 to 12 arranged equally spaced upon its periphery. The second element has a "x" symbol marked symmetrically and periodically about its periphery. The third element has marked on its periphery the numbers 1 to 12 in identical fashion to that of the first element. The fourth element has at least one =sign upon its periphery. The fifth element is a result/answer element and has marked upon its periphery one of the sets of numbers taken from columns E1 through to column E11 of FIG. 3. In practice eleven separate wheels are available for element five, each wheel having a different set of numbers corresponding to one of the columns E1 through E11 of FIG. 3 which themselves correspond to the answers to the two times, three times, four times. . . twelve times tables.

The result element 5 has one of the end views E1 through to E11 as shown in FIG. 4 dependent upon which of the times tables it represents. In use if a child would like to learn the three times table the child rotates the first element until the digit 3 faces him or her. A child then rotates the third element until a desired one of the numerals 1 through to 12 on the periphery of this element is facing the child. Say for example that the child picks the numeral 4 then the child now has facing him or her the equation "3 ×4 =". The child now rotates the fifth element until what the child believes to be the correct answer to the equation is also facing the child. The child can check to see whether the correct answer is in fact aligned by checking the end of the fifth element to see whether the facing digit of the third element is the same as the digit on the end view of the fifth element immediately adjacent the peripheral location of the peripheral digit chosen as the answer by the user. If the numbers match then the answer is correct. If they do not then, by using the end view of the fifth element, the user can rotate the fifth element until the correct answer appears aligned in the equation. In this particular example the desired equation is "3 ×4 =12". The end view peripheral digit to give the answer 12 will be a 4 as shown on the "three times" element E2 of FIG. 4. The exercise can be repeated for different equations involving the three times table merely by rotating element three and then rotating element 5 in order to provide a matching result. If the times table is to be changed say, for example, to the seven times table then a seven times table result element or wheel (wheel E6 of FIG. 3) will need to be installed as the fifth element on the axle 6.

Preferably the individual numbers located on the peripheral edges of the disc shaped elements are themselves located on flattened portions on the periphery. For example for a twelve digit element there will be twelve individual flat surfaces. The resulting element has a cross-sectional shape as shown in FIG. 2. Alternatively the Figures can be printed on to a purely circular periphery.

Figures 5A, 5B:
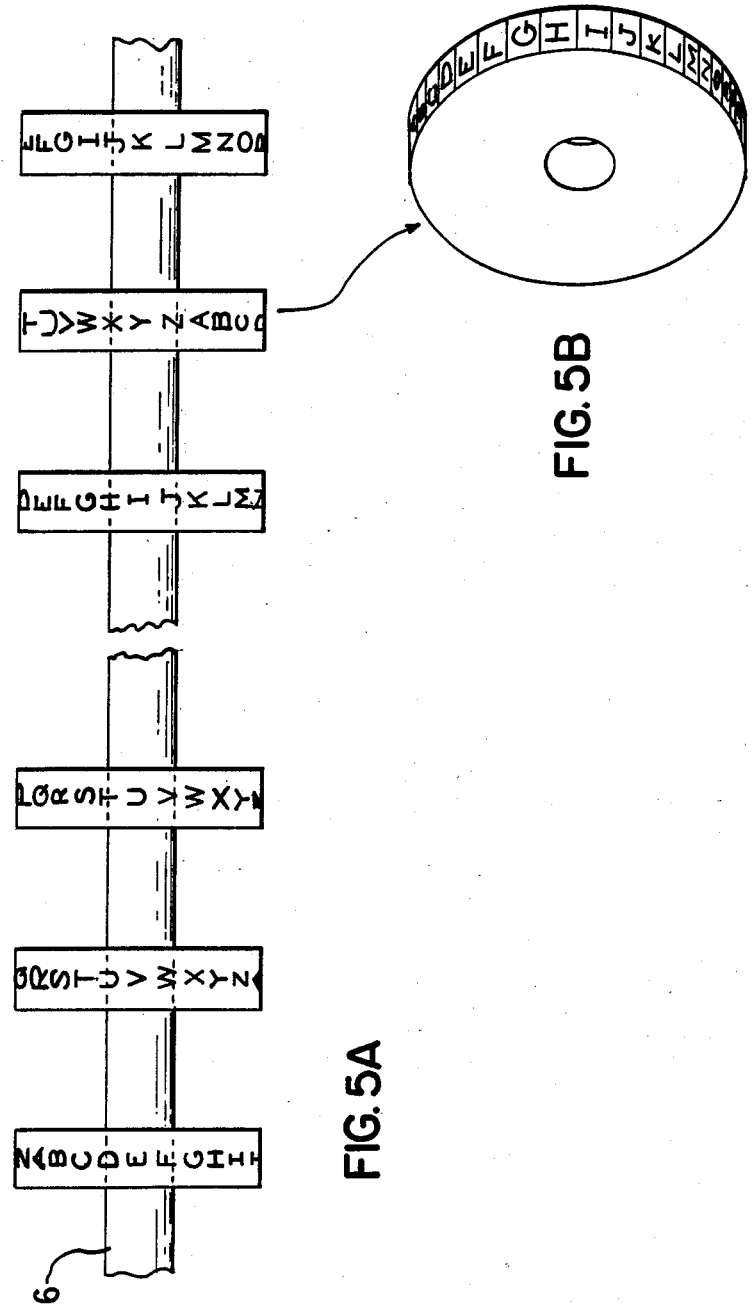
FIGS. 5A and 5B show views of a second embodiment.
Figure 6C:
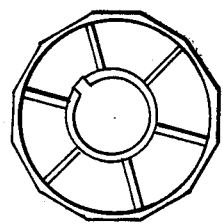
FIGS. 6A–6G show details of the axle arrangement suitable for use on either the first or second embodiment.
Figure 6F:
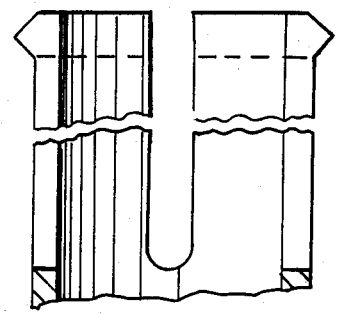
Figure 6B:
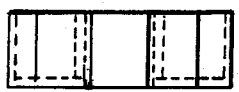
Figure 6A:
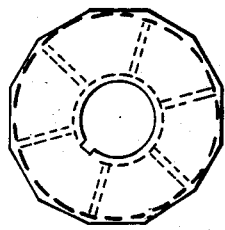
Figure 6E:
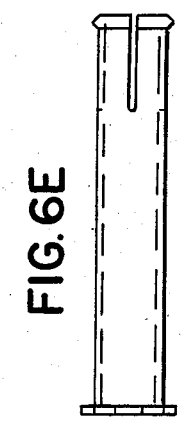
Figure 6D:
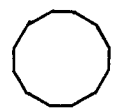
Figure 6G:
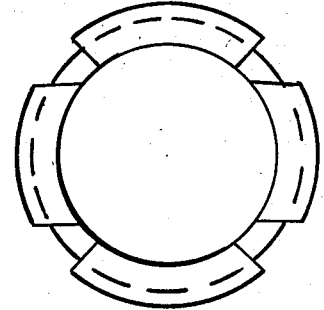

FIG. 5 shows a second embodiment of the device wherein fifteen disc shaped elements are juxtaposed on an axle 6. In this case each element has 26 characters embossed on its periphery, the FIGS. being the letters of the alphabet. Also included are two blank spaces for use as word separators. The elements can be rotated until words are formed by the aligned letters facing the user. This embodiment allows a child to experiment with the formation of words in a manner similar to "scrabble" games but by way of a rotational, relational structure.

Referring to FIG. 6 details of a preferred form of the axle 6 are shown. Essentially an inwardly deformable end is created by placing slots therein as indicated, the end having a raised rim 7 which provides resistance to the threading on or threading off of the disc shaped elements. The diameter of the central aperture of the disc shaped element is such that gentle pressure applied while attempting to thread the element onto the axle 6 will cause the end of the axle to be collapsed slightly upon itself such that the disc shaped element can be threaded thereon. Once the element is upon the rod 6 nd clear of the raised rim 7 the end of the axle reforms to its original structure whereby the raised rim 7 provides resistance to the removal of the disc shaped element therefrom.

The device of either embodiment can be made from suitable resilient materials such as commercially available plastics.

The above describes only some embodiments of the present invention and modifications, obvious to those skilled in the art, can be made thereto without departing from the scope and spirit of the present invention.

For example the device can be mounted upon a stand in order to support the device as rotation of the disc shaped elements takes place.

Also a shield can be provided over the periphery of all the disc shaped elements on the rod so that only indicia lying in a straight line aligned within a window can be observed.

The first embodiment specifically describes a multiplication table the same principle could equally be applied for addition, subtraction and division tables. In these situations the disc shaped element 2 would be replaced by an element having either a +, −, or ÷ symbol as indicia on the periphery thereof. The answer element 5 would be appropriately modified to provide corresponding answers.

In a further embodiment the axle can be replaced by an interlocking mechanism between the disc shaped elements. For example each element can be made with a protrusion on one side centered around the axis of the element and a corresponding receiving cavity on the opposite side of the element. The protrusion of a first element can be connected into the receiving member of an adjacent element such that the two can be maintained in a rotational relationship, rotating on a common axis. By this mechanism an indefinite number of elements can be attached to each other in the rotational relationship.

While generally circular elements have been described above the periphery of the elements can comprise other shapes. For example the cross-section of the element could be square or triangular. In this case only four or three faces respectively would be available for the application of indicia.

I claim as my invention:

1. A relational, rotational structure comprising a plurality of disc-shaped elements mounted in juxtaposed relation and rotatable on a common axis; individual ones of said elements having indicia located on the periphery of each said element such that the relationship between indicia on different ones of said elements can be viewed with respect to indicia on others of said elements; and wherein the number of said elements is five, the first of said elements including indicia comprising numerals, the second of said elements including indicia selected from the set of symbols "X, +, −, ÷", the third of said elements including indicia comprising numerals, the fourth of said elements including indicia being an "=" sign, the fifth of said elements including indicia comprising numerals selected from the answers to individual ones of the equations resulting from aligning indicia on all of said elements; said fifth of said elements having check indicia located on an external end face; said check indicia being identical to said indicia on said third element and being located on said end face so that respective ones of said check indicia match with respective ones of said indicia on said third element; the choice of said fifth element being dependent on the choice of said first element and said second element whereby appropriate check indicia and appropriate said indicia are provided on said fifth element.

2. The structure of claim 1 wherein said first element includes indicia comprising the numerals 1 through 12, the second of said elements has indicia marked thereon being the symbol "X"; said third of said elements having indicia marked thereon comprising the numerals 1 through 12; the fifth of said elements having indicia marked on the periphery thereof comprising numerals being the answers to individual ones of the 1 through 12 times table dependent upon the numerals appearing upon said third element.

3. The structure of claim 1 or claim 6 wherein individual ones of said indicia lie on a separate flat surface on the periphery of respective ones of said elements upon which respective ones of said indicia are located.

* * * * *